United States Patent
Hsieh et al.

(10) Patent No.: US 12,519,278 B2
(45) Date of Patent: Jan. 6, 2026

(54) FORMATION OF A BEAM WITH A FLAT-TOP PROFILE AND ELONGATED CROSS-SECTION AND USE OF SAME

(71) Applicants: Yung-Chieh Hsieh, San Jose, CA (US); Chiayu Ai, Newark, CA (US)

(72) Inventors: Yung-Chieh Hsieh, San Jose, CA (US); Chiayu Ai, Newark, CA (US)

( * ) Notice: Subject to any disclaimer, the term of this patent is extended or adjusted under 35 U.S.C. 154(b) by 802 days.

(21) Appl. No.: 17/868,016

(22) Filed: Jul. 19, 2022

(65) Prior Publication Data

US 2023/0030757 A1 Feb. 2, 2023

Related U.S. Application Data

(60) Provisional application No. 63/223,947, filed on Jul. 20, 2021.

(51) Int. Cl.
| | |
|---|---|
| *H01S 3/00* | (2006.01) |
| *G02B 27/09* | (2006.01) |
| *G02B 27/12* | (2006.01) |

(52) U.S. Cl.
CPC .......... *H01S 3/005* (2013.01); *G02B 27/0972* (2013.01); *G02B 27/126* (2013.01)

(58) Field of Classification Search
CPC .... H01S 3/005; G02B 27/126; G02B 27/0972
USPC ........................................ 359/489.09
See application file for complete search history.

(56) References Cited

U.S. PATENT DOCUMENTS 5,134,426 A * 7/1992 Kataoka ............... G11B 7/1398

* cited by examiner

*Primary Examiner* — Bumsuk Won
*Assistant Examiner* — Mitchell T Oestreich
(74) *Attorney, Agent, or Firm* — Quarles & Brady LLP; Yakov S. Sidorin

(57) ABSTRACT

Methodology of forming a substantially flat-top illuminating light beam, from a beam at the laser output having a conventionally non-uniform distribution of irradiance, with the use of only a birefringent prismatic element and light-focusing optics. Preferably, the cross-sectional area of such illuminating light distribution is shaped to be elongated or even substantially rectangular to have it used advantageously in various metrological situations such as, for example, the operation of a moving particle analyzer.

18 Claims, 5 Drawing Sheets

FORMATION OF A BEAM WITH A FLAT-TOP PROFILE AND ELONGATED CROSS-SECTION AND USE OF SAME

CROSS-REFERENCE TO RELATED APPLICATIONS

This application claims the benefit of U.S. Provisional Patent Application No. 63/223,947, filed on Jul. 20, 2021 and titled "Spatial flat-top beam profile for uniform illumination" the entire disclosure of which is hereby incorporated by reference herein, for all purposes.

TECHNICAL FIELD

The embodiments of the invention relates to methodology of reshaping a laser output beam to form a beam of light with a cross-sectional profile in which the spatial distribution of irradiance is substantially uniform (and referred to as "flat-top") while doing so in a fashion to make such spatial distribution substantially insensitive to fluctuation of phase in the laser light output (and, more particularly, to such reshaping that is devoid of beam apodization, beam scanning components, and/or use of an optical waveplate), as well as use of such reshaping in various metrological applications.

RELATED ART

Related art recognizes several approaches used to attempt to create a flat top profile of irradiance of spatial light distribution. One of the simplest is apodization, where a neutral density filter with an inverse Gaussian transmission characteristic is used to flatten the laser irradiance spatial profile. This approach has the disadvantage of energy loss, as well as the requirement that the filter be carefully aligned to the laser beam that is difficult to maintain. Another approach—such as that disclosed in U.S. Pat. No. 8,259, 396—utilizes diffractive optics designed to generate a flat top profile. This approach has the disadvantage of optics being difficult to manufacture in low volume. Yet another approach is disclosed in U.S. Pat. No. 8,451,524, and utilizes scanning of the laser output beam. Here, the amplitude of the scanning motion, the dwell time of the beam at any given point, and the Gaussian intensity profile of the laser beam all are selected to cooperate in forming an effective flat top illumination profile over the period of integration. The disadvantage to this approach is that it requires scanning optics, which can be expensive. Yet another approach, discussed in U.S. Pat. No. 10,788,411 utilizes a rather complex system of phase retarders a necessary component of which is an optical waveplate.

Notably, while the integrated over time spatial profile of a laser output beam of particularly poor quality (that is, the one of high $M^2$ value) may be in some cases considered to be approaching a flat-top profile, a person of skill well knows that this profile is characterized by temporal instability caused by optical interferences between and among different high-order spatial modes present in such laser output. (The $M^2$ factor of a laser beam also referred to as a beam quality factor or beam propagation factor, is a common measure of the beam quality of a laser beam and is known in related art to represent the degree to which the light beam can be focused for a given beam divergence angle. A diffraction-limited beam such as a Gaussian beam, for example, has an $M^2$ factor of 1.)

There remains a need in a structurally simple, easily adjustable optical system configured to reshape a naturally occurring spatial profile of the output laser irradiance into a flat-top profile in a fashion that is temporally stable and not subject to changes of a phase of the laser output.

SUMMARY OF THE INVENTION

An embodiment of the present invention provides a method that includes a step of separating a polarized beam of light into multiple beams (containing a first beam having a first polarization and a second beam having a second polarization) by transmitting the polarized beam of light through a at least one optical prism (here, the first and second polarizations are different from one another) and a step of directing the first beam in a first direction and directing the second beam in a second direction, the first and second directions being separated by a displacement. The embodiment additionally includes a step of spatially overlapping the first and second beams of light to form an illuminated region with a cross-sectional area characterized by a substantially uniform distribution of light, and at least in once specific case is devoid of using an optical waveplate. In one case, embodiment of the method is configured to satisfy one of two conditions. The first condition is such that (i) transmitting the polarized beam of light through the birefringent material oriented to have a single optical axis thereof substantially perpendicular to a direction of propagation of the polarized beam of light; and/or (ii) transmitting the polarized beam of light through the birefringent material dimensioned as a wedged prism having an incident surface thereof substantially perpendicular to the direction of propagation of the polarized beam of light; and/or (iii) transmitting the polarized beam of light through the birefringent material while orienting a vector of linear polarization of the polarized beam at a substantially 45 degree angle with respect to the single optical axis of the birefringent material. The second condition is such that transmitting the polarized beam of light through includes transmitting the polarized beam of through a Wollaston prism or a polarization beam splitter. Additionally or in the alternative—and substantially in every implementation of the method—the step of directing may include focusing the first beam of light into a first focal spot and focusing the second beam of light into a second focal spot, the first and second focal spots being separated by focal separation distance. Alternatively or in addition, (A) the step of spatially overlapping may include forming the illuminated region substantially devoid of optical interference between the first and second beams such that the cross-sectional area is substantially transverse to a direction of propagation of the polarized beam; and/or (B) the step of separating may include separating the polarized beam of light into multiple pairs of beams (where a first beam in each pair has a corresponding first polarization and a second beam in each pair has a corresponding second polarization while the embodiment additionally includes spatially overlapping all multiple beams to form the illuminated region. Optionally, the separating may include transmitting light from the polarized beam of light through multiple birefringent crystals, and/or the separating may include transmitting the light from the polarized beam of light sequentially through multiple birefringent crystals. Alternatively or in addition, and substantially in every implementation of the method, the method may also contain at least one of the following steps: (a) rotating a vector of polarization of the polarized beam of light prior to said transmitting, and/or (b) co-locating the illuminated region and a sample region of a moving particle analyzer system to analyze moving particles of a chosen sample present in the sample region, and/or (c) co-locating the illuminated region and a sample region of a flow cytometry system. (In at least one specific embodiment, when the step of rotating is present, such step of rotating may include: rotating a mechanical frame of a laser source configured to generated said polarized beam of light about an axis of the polarized beam of light, and/or transmitting the polarized beam of light through a Faraday rotator system.

Embodiments of the invention also provide an optical system that contains a laser source configured to generate a polarized beam of light; an optical element configured to receive the polarized beam of light, generated by the laser source in operation, and to separate the polarized beam of light into multiple beams of light including a first beam and a second beam, the first and second beams having different states of polarizations; and an optical device configured to acquire and redirect the multiple beams in respectively-corresponding different directions that are separated by a displacement such as to spatially overlap the first and second beams in an illuminated region having a cross-sectional area characterized by a substantially uniform distribution of light. In at least one case, the displacement may include an angular displacement. In at least one specific case, such system does not include an optical waveplate. Alternatively or in addition and substantially in every implementation of the system, one of more of the following conditions may be satisfied: the optical element includes (i) a birefringent material and/or a Wollaston prism or (ii) a polarization beamsplitter; the system further comprises a tangible component dimensioned to house a flow of moving sample particles; the optical device comprises a light-focusing device configured to focus the first beam acquired by said light-focusing device into a first focal spot and focusing the second beam acquired by the light-focusing device into a second focal spot, the first and second focal spots being separated by focal separation distance. (Here, the optical device may include an optical lens and/or an optical reflector). Alternatively or in addition, and substantially in every implementation of the system, (i) the system may contain one or more of a particle analyzer and a cytometry system; and/or (ii) the optical element may include a birefringent material that has a material composition that includes quartz. Alternatively or in addition—and substantially in every implementation of the system: (1) the optical element may include a birefringent material that is oriented to have a single optical axis thereof substantially perpendicular to a direction of propagation of the polarized beam of light; and/or (2) the optical element may include the birefringent material dimensioned as a wedged prism having an incident surface thereof substantially perpendicular to the direction of propagation of the polarized beam of light; and/or (3) the optical element may include the birefringent material that has a single optical axis oriented t a substantially 45 degree angle with respect to a vector of linear polarization of the polarized beam. In at least one case, the displacement may include an angular displacement. Optionally, an embodiment of the invention may include a combination of first and second birefringent materials (such combination being configured to separate the polarized beam of light into multiple pairs of beams, where a first beam in each pair has a corresponding first polarization and a second beam in each pair has a corresponding second polarization). Optionally, alternatively or in addition, the system may include an optical device (such as, in a specific case, a Faraday rotator) configured to rotate a vector of polarization of the polarized beam of light and disposed between the laser source and the birefringent material. An embodiment of the associated method includes at least using any of the alternative embodiments of the system mentioned above; co-locating the illuminated region and a sample region of a moving particle analyzer system to analyze moving particles of a chosen sample present in the sample region, and/or co-locating the illuminated region and a sample region of a flow cytometry system; and analyzing moving sample particles passing through the sample region in absence of optical interference between light of the first beam and light of the second beam. Optionally, any embodiment of the method of the invention can be complemented by a step of generating a report containing results of analysis of the moving sample particles. (Such report may be generated with the use of a programmable processor of the system used to effectuate the method.)

Embodiments of the invention further provide a method that includes the steps of: a) delivering a polarized beam of light generated by a light source directly to at least one optical prism (in this context, the term "directly" is defined as not having an optical device or a structural component in between the light source and the at least one optical prism); b) separating a polarized beam of light into multiple beams including a first beam having a first polarization and a second beam having a second polarization by transmitting the polarized beam of light through the at least one optical prism; c) directing the first beam in a first direction and directing the second beam in a second direction, the first and second directions being separated by a displacement; and d) necessarily incoherently spatially overlapping the first and second beams of light to form an illuminated region with a cross-sectional area characterized by a substantially uniform distribution of light. In at least one implementation of this method the method may be configured to satisfy one or more of the following conditions: (i) transmitting the polarized light includes transmitting the polarized beam of light through the birefringent material oriented to have a single optical axis thereof substantially perpendicular to a direction of propagation of the polarized beam of light; (ii) transmitting the polarized light includes transmitting the polarized beam of light through the birefringent material dimensioned as a wedged prism having an incident surface thereof substantially perpendicular to the direction of propagation of the polarized beam of light; and (iii) transmitting the polarized light includes transmitting the polarized beam of light through the birefringent material while orienting a vector of linear polarization of the polarized beam at a substantially 45 degree angle with respect to the single optical axis of the birefringent material. At least one implementation of the method may additionally include rotating a vector of polarization of the polarized beam of light prior to the transmitting the polarized beam of light through the at least one optical prism by rotating a mechanical frame of the light source; and/or co-locating the illuminated region and a sample region of a moving particle analyzer system to analyze moving particles of a chosen sample present in the sample region; and/or co-locating the illuminated region and a sample region of a flow cytometry system.

BRIEF DESCRIPTION OF THE DRAWINGS

The invention will be more fully understood by referring to the following Detailed Description of Specific Embodiments in conjunction with the Drawings, of which.

Figure 1A:
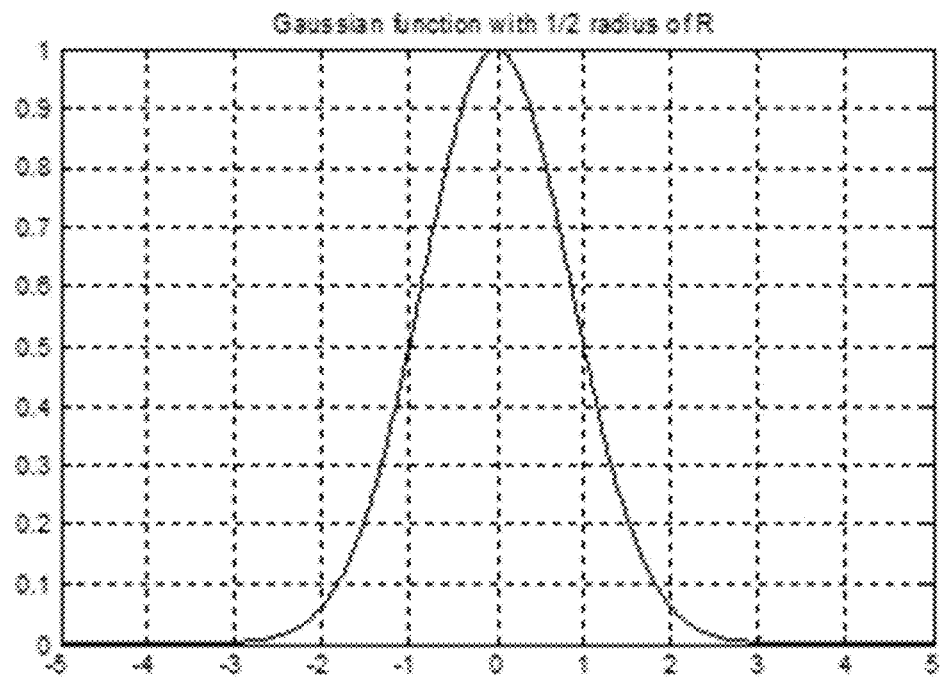
FIGS. 1A, 1B, 1C, and 2 illustrate spatial light distribution formed by a single Gaussian-type laser beam output or a combination of several of such outputs under specified conditions.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with preferred embodiments of the present invention, methods and apparatus are disclosed for reshaping spatial light distribution of a light output from the laser source to produce a substantially uniform elongated light distribution and use of such distribution. The disclosure of each of the references ascribed or mentioned in this application is incorporated by reference herein.

The idea of the invention stems from the realization that complex preparatory manipulations with the polarized laser light output, including the use of an optical waveplate discussed in related art not only complicates the process of the formation of a flat-top light distribution but also substantially prevents the use of the same system effectuating the process of such formation from operating at substantially every wavelength of choice (due to the known spectral dependency of operation of the optical waveplate), and that a rather straightforward combining (spatially superimposing) of multiple sub-beams into which the original laser light output beam is transformed produce the desired effect as long as these sub-beams are combined in a fashion that prevents the combined sub-beams from interfering with one another. Implemented as discussed below, embodiments of the invention may find various applications one of which is analysis of moving particles (with the use of, for example, flow cytometry).

Flow cytometry is a technology that is used to analyze the physical and chemical characteristics of particles in a flow of a sample fluid as its passes (typically, inside the flow tube) through a region illuminated with laser light. Biological cells (blood, for example) can be fluorescently labeled in advance and then excited by laser light (propagating substantially transversely to the direction of the flow) to emit fluorescence at a desired wavelength. (For the same of efficiency, it is typically preferred that the cross-sectional dimensions of the laser-light illuminated region of the flow be those of a linearly elongated region, such that the larger dimension is substantially transverse to the direction of the flow.) The generated fluorescence can be measured to determine various properties of single particles. Examples of the properties measured include the particle's relative granularity, size and fluorescence intensity as well as its internal complexity. An optical-to-electronic coupling system of a flow cytometer is used to record the way in which a given particle emits fluorescence and reflects and/or scatters incident laser light. The optical system of a flow cytometer includes at least in part a laser source that illuminates, in operation, the particles present in the stream of sample fluid. As the particles pass through the flux of the incident laser light, they scatter the light and the scatter is collected with the appropriately structured light-collection system to store data about each particle or event. The characteristics of those events or particles are determined based on their fluorescent and light scattering properties. The electronic system of a flow cytometer is configured to receive reflected and/or scattered light signals with one or more detectors and convert them into electronic pulses that represent data over time that a computer can process. The data can then be analyzed with the computer to ascertain information about a large number of biological cells over a short period of time. Example of a structure and principle of operation of a flow cytometer and, in particular, details of using in such a cytometer of a flat-top cross-sectional distribution of laser light (which is within the scope of the embodiment of the present invention) is presented, for example, in U.S. Pat. No. 10,788,411 (in particular, in reference to FIGS. 1, 2A, 2B of this patent document)—and for this reason is not discussed in this disclosure in any detail.

Upon the analysis of the existing methodologies of forming the flat-top laser light spatial distribution, it becomes apparent that related art unnecessarily complicates the process of formation of such a distribution and limits the spectral range of wavelengths at which such process can be implemented with the use of the same system as long as the system employs an optical waveplate. In fact, the judicious analysis suggests that substantially the only element required to achieve the desired result—that is, in addition to the source of laser light and a limited number for light-focusing components such as lenses or reflectors and associated mechanical repositioner(s)—is a body of birefringent material (for simplicity of operation—an optical prims made of the birefringent material, typically a birefringent crystal material, or BRF prism, for short).

What is discussed below is a reliably operationally stable process of formation of a flat-top spatial distribution of laser light (approaching in cross-sectional shape that of a rectangle) by merging/superposing, in a row at the target region, of multiple laser beam having a substantially Gaussian distribution of irradiance and produced with the use of a BRF prism from the same laser output beam of light.

A skilled person may consider, for simplicity, a uniaxial birefringent crystal. When a beam of polarized laser enters (is incident onto) the BRF prism at a near zero-degree angle of incidence while the single optical axis of the crystal is substantially parallel to the entrance surface of the prism (which, in this case, is an incident surface), the vector of electric field of the incident light is split (upon transmission of the light through the BRF prism) into two beam components having mutually orthogonal polarizations. The amplitude ratio of the two components is dependent on the angle between the vector of polarization of the incident beam and the optical axis of the crystal: if this angle is substantially 45 degrees, then the irradiance of the two so formed we have two spots of equal intensity and can be used to obtain a flat-top profile. If this angle value differs from 45 degrees, one can vary the vector of polarization of the laser output beam (that is, of the incident light) by simply rotating the laser frame i.e., the laser tube (and/or transmitting the polarized beam of light through a Faraday rotator system prior to delivering it to a BRF prism) and thus avoiding the use of any additional phase retarders such as an optical waveplate at all. The preferred configuration, therefore, is to not have any wavelength sensitive elements between the laser source and the optical component effectuating splitting of the incident light into the two beam-components.

If the angle of incidence of the laser beam onto the BRF prism is substantially zero degrees (that is, the angle of incidence is substantially zero), the beam of light does not deflect after passing the front (incident) surface does not deflect; at the same time, the beam is split into two beams as a result of traversing the second surface of the BRF prism—and such two beams are redirected along different axes and have an (angular) deviation or displacement between them. With the use of an optical focusing system (which may include a lens and/or a reflector) the two beams at the output from the BRF prisms can then be focused on and/or overlapped at the same target region of space, at two points that are spaced from one another. The spacing between the two focal spots at the back focal plane of the optical focusing system is determined by the focal length (f) and the (angular) displacement. Since the overlapping beams have different polarization, the conventional optical interference effects at the target region are avoided (for example, no laser speckle is present at the target region), thereby ensuring an operationally stable (in a non-limiting example—temperature independent) spatial distribution of light. (In the specific off chance when the laser output light is only partially polarized, one can utilize a linear polarizer disposed between the laser source and the BRF prism.)

A skilled person will readily appreciate the logic of the above-proposed methodology by referring to the following details.

A standard Gaussian functional distribution can be expressed as $$f(x) = 2^{-(\frac{x}{R})^2}$$

The normalized function f(x) is a symmetric function of x. When x=0, f(0)=1, and when x=R, we have f(R)=0.5. Thus, R represents a linear coordinate corresponding to the half-width-at-half-maximum value (HWHM) of the amplitude of the Gaussian function. To simplify the expression, without losing the generality, the value of R is set now to 1.

Figure 1B:
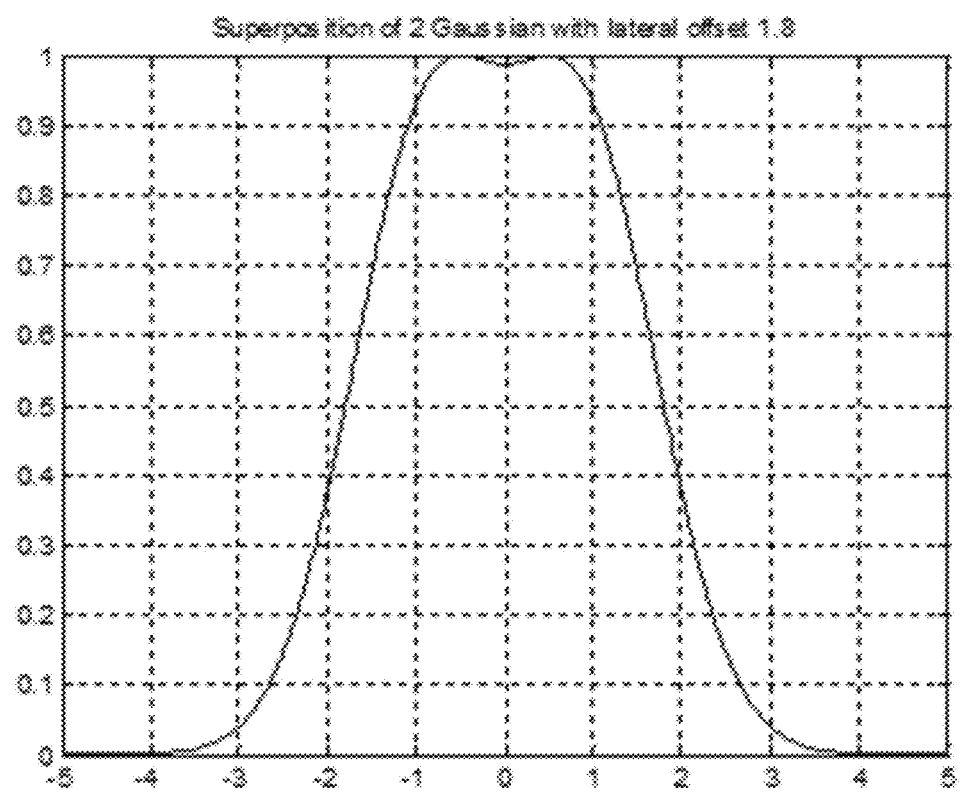
Figure 1C:
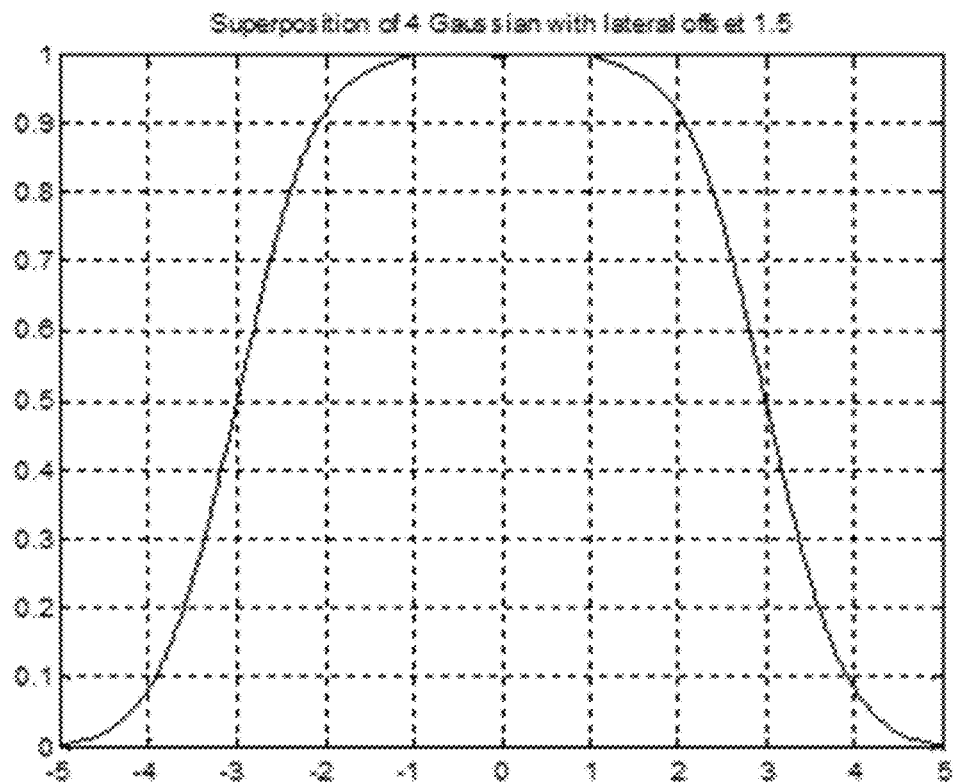
Figure 2:
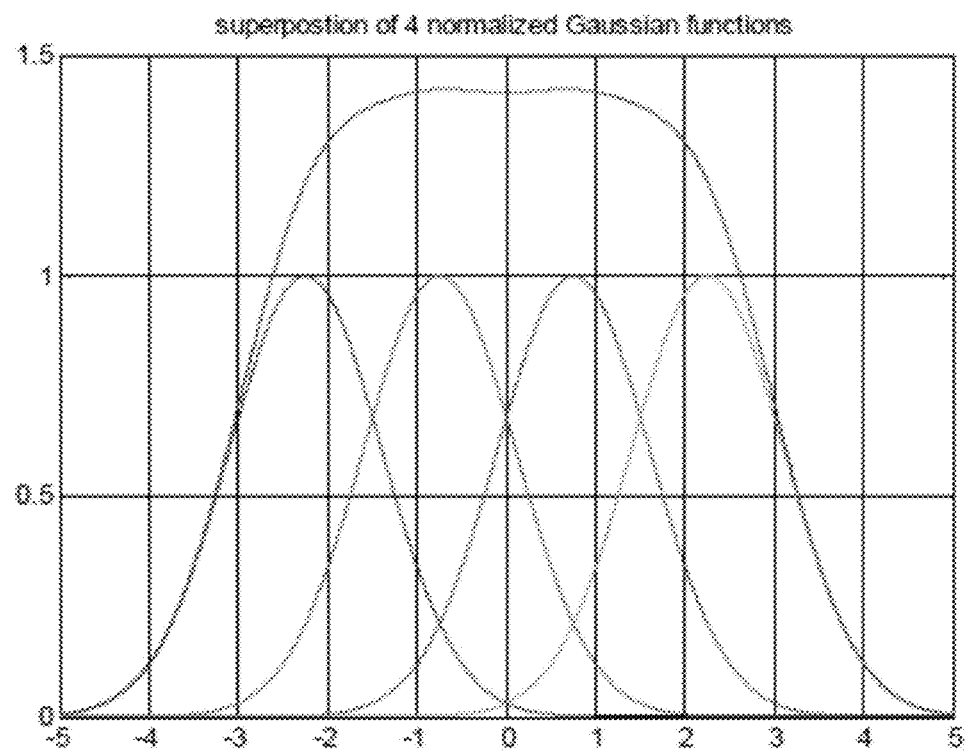

FIG. 1A presents the Gaussian function with HWHM=1 (i.e., radius R=1),), or full-width at half-maximum (FWHM)=2, and peak value=1, while FIG. 1B shows the result of superposition of the two Gaussian functions, each of which has the same shape as that of FIG. 1A and which are displaced from one another, peak-to-peak, by 1.8*R. When using a mathematical function for description of a profile of the illumination intensity distribution, FWHM is considered to be the diameter of the intensity profile. As one can see from FIG. 1B, when the two identical Gaussian distributions are separated by 0.9 of the diameter of the focal spot, the combination of such distributions forms a substantially flat-top function with operationally negligible dip at the center. FIG. 1C illustrates the result of the composition of the four identical Gaussian functions of FIG. 1A with one another under the assumption that the peak-to peak separation is equal to 1.5*R, while FIG. 2 shows the superposition of four such normalized functions under the same assumption. It can be observed that the shape of the peak of the summed result is approaching a uniform/flat shape, at a level of about 1.4. The comparison of the results of FIGS. 1A, 1B, 1C, and 2 illustrates that the superposition of multiple Gaussian beams effectively widens the beam width, thereby providing an elongated light spot with a substantially flat top intensity profile (approaching a level of plateau) by spatially combining multiple displace from one another beams.

Notably—referring again to FIGS. 1A, 1B, 1C, and 2—the summation of multiple Gaussian functions was that representing an incoherent addition (which corresponds to forming the sum of intensities or irradiances of light, instead of the sum of the corresponding electric fields). In order to implement such incoherent addition in practice, one has to avoid the coherent interaction (interference) between the electrical fields of the light beams being summed, which in at least one specific case can be achieved by ensuring that each of the summed beams has a polarization that differs from the polarization of each and every other beams—for example a polarization that is orthogonal to those of the adjacent beams. Such condition can be satisfied with the use of optical elements that are polarizationally-sensitive—for example, possess birefringent optical properties—to split one initial incident laser beam into constituent beams (to-be-incoherently-overlapped) that have mutually orthogonal polarizations. (A skilled person knows that if such constituent beams have substantially equal states of polarization, the spatial overlapping of such constituent beams will be but a coherent spatial overlapping.) The Gaussian distributions of light irradiance in this disclosure is but an example, and understandably different constituent light distributions can be employed—for example, an Airy function or other types.

Figure 3:
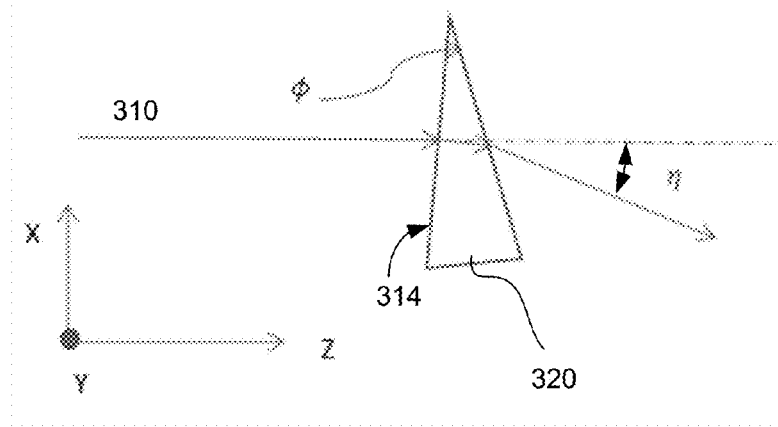
FIG. 3 is a schematic showing spatial deviation of a beam of light propagating through an optically isotropic prismatic element.

To this end, FIG. 3 schematically illustrates the incidence of a light beam 310 onto the entrance (incident) surface 314, of a wedged prism 320, at a substantially zero angle along the local z-axis and transmission of the beam 310 through such prism. The prism 320 is considered to be made of a substantially isotropic material with a refraction index n and an apex angle ϕ, upon which passing the beam is deviated from its original direction by an angle η≅(n−1)ϕ. In contradistinction, as known in related art, in a birefringent crystal material the refraction indexes, $n_x$ and $n_y$, are different depending on the direction of oscillation (x- or y-) of the electrical field of the beam, and as a result the beam 310 is effectively split into two constituent beams having orthogonal polarizations and deviated from the original direction of propagation of the beam 310 at different angles $$\eta_x \approx (n_x-1)\phi, \eta_y \approx (n_y-1)\phi$$

The angular deviation between these two beams is, therefore, $$\Delta\eta = (\eta_x-\eta_y) \approx (n_x-n_y)\phi$$

Figure 4:
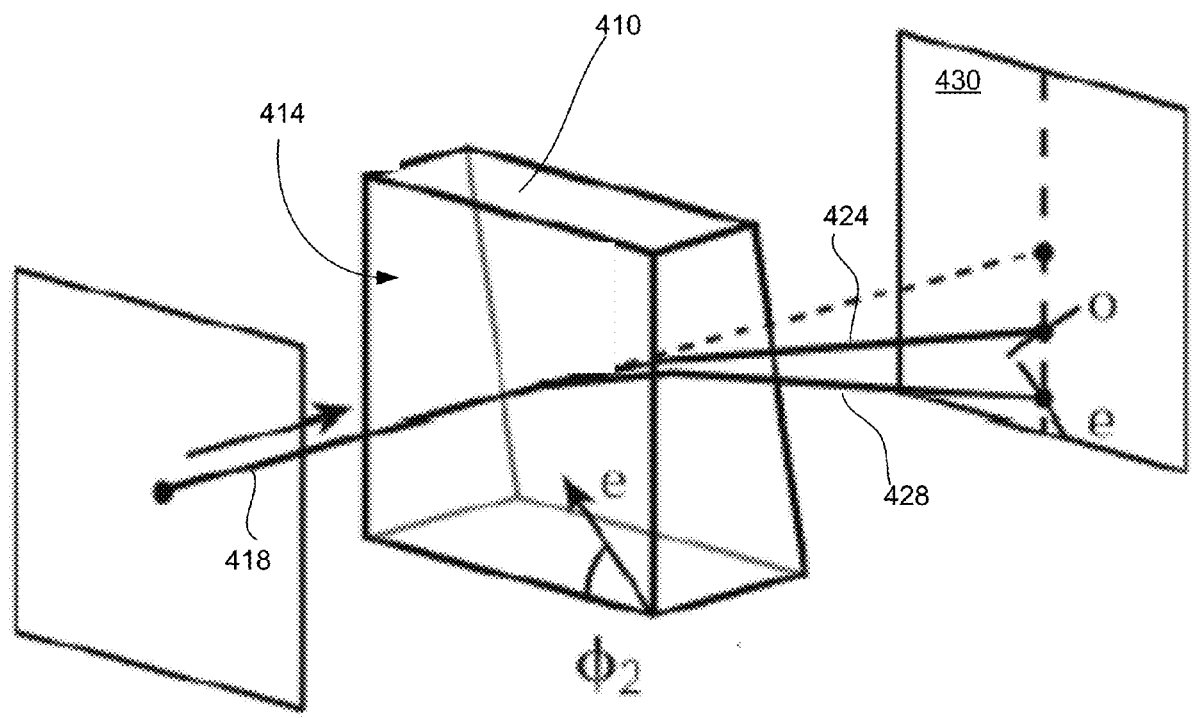
FIG. 4 is a schematic illustrating spatial separation of light propagating through a prismatic element made of a uniaxial birefringent material into two spatially-displaced beams of mutually orthogonal polarizations.

FIG. 4 shows a prism made 410 of uniaxial birefringent material with its optical axis parallel to the front surface 414 and directed at an angle ϕ2=45° relative to the local x-axis. As a skilled artisan will readily recognize, when the incident laser beam 418 is substantially perpendicular to the incident surface 414 (the xy-plane in FIG. 4), the vector of polarization of the beam 418 lies in the xy-plane and. If the vector of polarization (E-field vector) of the beam 418 is, for example, parallel to the x-axis, the laser beam 418 is substantially evenly split into 424, 428 that have, respectively, ordinary and extraordinary (o- and e-) polarizations (with the e-polarization vector forming a 45-degree angle with the vector of polarization of the beam 418) and that are displaced from one another, thereby producing two different spots on the observation screen 430. (Understandably, when the mutual angular orientation of the optical axis of the uniaxial birefringent crystal of prism 410, located in a plane parallel to the incident surface 414, and the polarization vector of the bean 418 is different, the "split" of the beam 418 into two output beams 424, 428 is not even and such output beams generally have different intensities while being spatially displaced from one another.)

Figure 5:
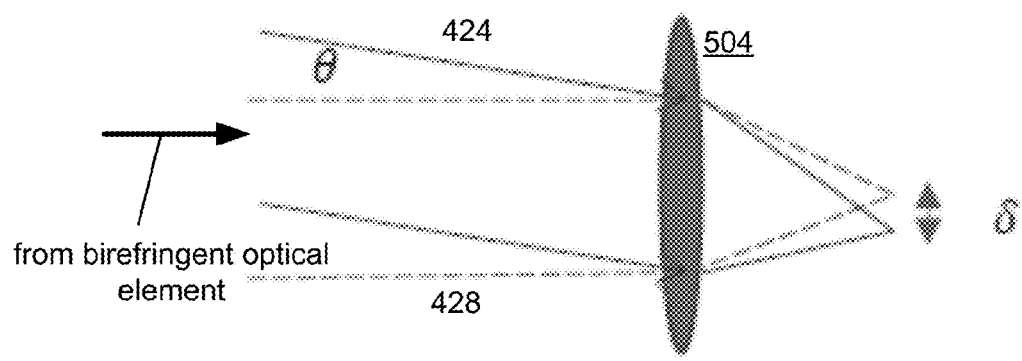
FIG. 5 schematically illustrates focusing of the spatially-displaced beams produced with a contraption of FIG. 4 from a single incident beam.

According to the idea of the invention, the two spatially displaced by an angle θ beams 424, 428 can be further directed to a light focusing optical system (represented, in the schematic of FIG. 5, by a simple lens element 504), to have the beams at least partially overlap, at the focal plane, while the focal spots remains transversely separated, center-to-center, by a distance δ thereby forming, without the use of an optical waveplate, an illuminated region of space in which the beams 424, 428 overlap. If the focal length of the lens element 504 is f, then the separation between the two Gaussian spots at the focal plane is $\delta \cong f\theta$. In order to create multiple Gaussian spots in the focal plan with a lateral offset, one has to convert the incident laser beam into a few beams with different directions of propagation before they transmit the lens.

A skilled person now readily appreciated that an embodiment of the system of the invention includes a laser source configured to generate a polarized beam of light; a birefringent material configured to receive the polarized beam of light generated by the laser source in operation and to separate the polarized beam of light into multiple beams of light including a first beam and a second beam, the first and second beams having different states of polarizations. The embodiment of the system also includes an optical device configured to acquire and redirect the multiple beams in respectively-corresponding different directions that are separated by a displacement such as to spatially overlap the first and second beams in an illuminated region having a cross-sectional area characterized by a substantially uniform distribution of light. Notably, at least in one case the embodiment of the system does not include an optical waveplate. In at least one specific case, the optical device includes a light-focusing device configured to focus the first beam acquired by the light-focusing device into a first focal spot and focusing the second beam acquired by the light-focusing device into a second focal spot, the first and second focal spots being separated by focus separation distance.

Figure 6:
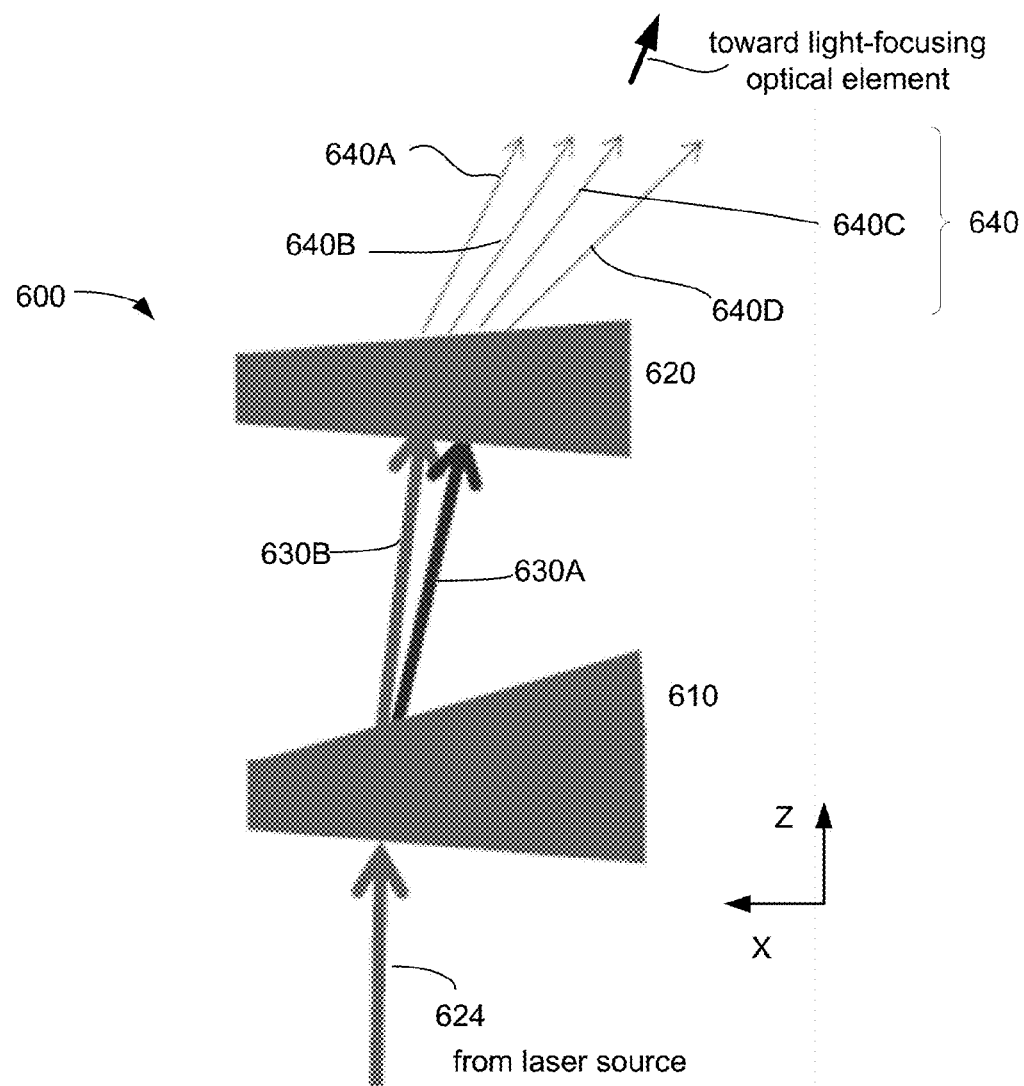
FIG. 6 is a top plans view of a sequence of two prisms each made of a uniaxial birefringent material, used to transform a single polarized beam of light into four spatially-displaced beams the immediately neighboring of which have mutually orthogonal polarizations.

Notably, the implementation of the idea of the invention may be expanded—as schematically illustrated in FIG. 6—to employing multiple BRF prisms, preferably sequentially as shown in top plan view of FIG. 6. Here, there are four different light beams formed at the output of the contraption 600 that includes the first wedge-shaped BRF prism 610 and the second wedge-shaped BRF prism 620. The polarization vector of the input (incident) beam 624 (which is incident onto the front surface of the prism 610 substantially normally) is at least approximately parallel to the local x-axis. The optical axis of the material of the prism is substantially parallel to the xy-plane and forms a 45-degree angle relative to the x-axis. Inside the crystal of prism 610, light of the beam 624 propagates parallel to the z-axis. The two (2) output beam components 630A, 630B have mutually orthogonal polarization vectors directed at +45 and −45 degree angles with respect to the x-axis. Beams 630A, 630B are displaced. The second BRF prism 620 is configured to have the optical axis of its uniaxial birefringent crystal to be parallel to the y-axis. Each of the two transmitted through the prism 620 beams 230A, 230B is further split into two sub-beams, thereby forming the laser light output from the system 600 that includes beams 640A, 640B, 640C, 640D. The output 640 (the combination of beams 640A, 640B, 640C, 640D) produces, after being passed through the light-focusing element (not shown), the spatial light distribution that is similar to those of FIGS. 1C, 2. In this configuration, the wedge angle of BRF 610 is about twice that of BRF 620. The polarization directions of 640A and 640C are substantially identical, and those of 640B and 640D are also identical, and the polarization directions of any 2 adjacent beams are mutually orthogonal, such as in pairs of (640A, 640B), (640B, 640C), (640C, 640D). Since polarizations of the adjacent beams are orthogonal, there is no interference occurring upon spatial overlapping of the corresponding beams. For the non-adjacent beams (such as 640A and 640C) the interference effect—if any—is understandably less significant since these beams are far apart and their overlap in practically negligible. To further reduce the possibility of optical interference between non-adjacent beams, in a related implementation the used may slightly change the angle(s) of incidence on the BRF prisms to make the relative optical phase between such non-adjacent beams close to 90-degrees.

Accordingly, one already discussed embodiment of the method of the invention includes at least separating a polarized beam of light into multiple beams (which include a first beam having a first polarization and a second beam having a second polarization) by transmitting the polarized beam of light through a birefringent material (here, the first and second polarizations are different from one another) and directing the first beam in a first direction and directing the second beam in a second direction (where the first and second directions are separated by a displacement). Such directing is followed-up by spatially overlapping the first and second beams of light to form an illuminated region with a cross-sectional area characterized by a substantially uniform distribution of light. In at least one case the method is necessarily devoid of using an optical waveplate. Having the information from the above discussion, a skilled person readily appreciates that embodiments of the invention that do not utilize (that is, lack) the optical waveplate—in contradistinction with that of related art—possess serious advantages: 1) An optical waveplate, being a highly wavelength-sensitive optical device, limits the use of the system to only a small range of wavelengths. The proposed embodiments are free from such limitation. 2) The phase retardation functions of the optical waveplate is known to be temperature-dependent, thereby removal of the optical waveplate from the system (or, not using it to begin with) makes the embodiment of the system less sensitive to temperature fluctuations.

Figure 7:
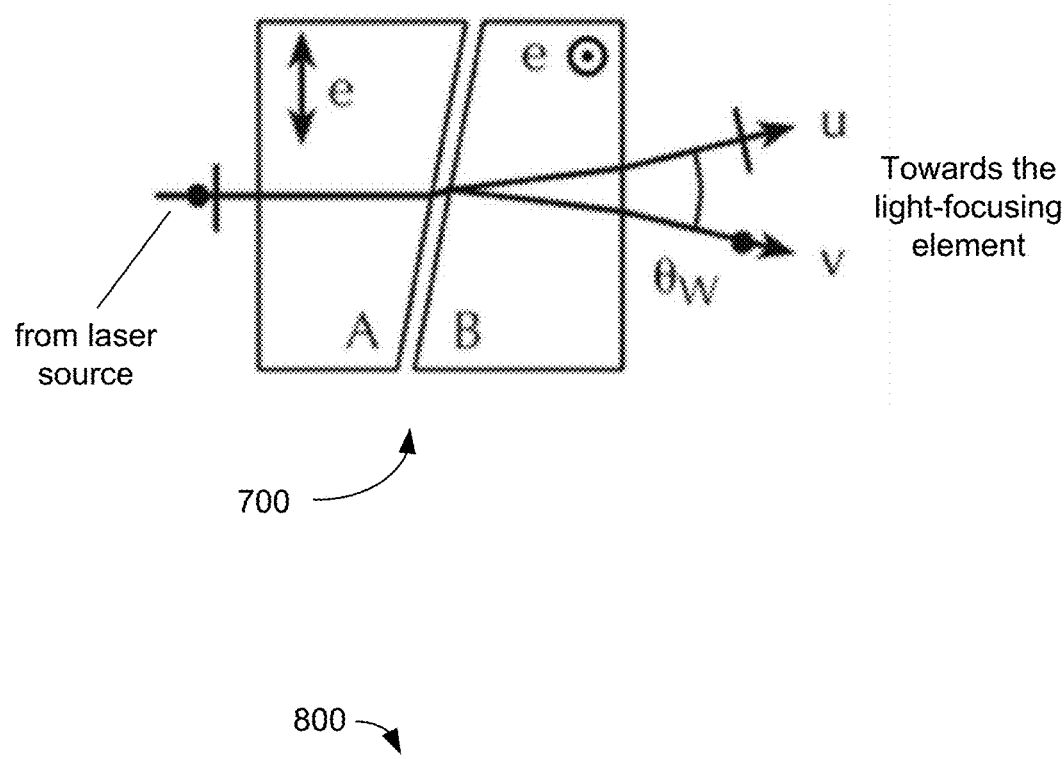
FIGS. 7 and 8 illustrate portions of alternative related embodiments of the invention.

FIG. 7 illustrates a variation of the above-discussed embodiments of the invention, in which the Wollaston prism arrangement 700 (consisting of sub-prisms A and B, as indicated) is used to split the incident polarized beam of laser light into two beams u and v that have mutually orthogonal polarizations and that propagate in angularly displaced directions.

Figure 8:
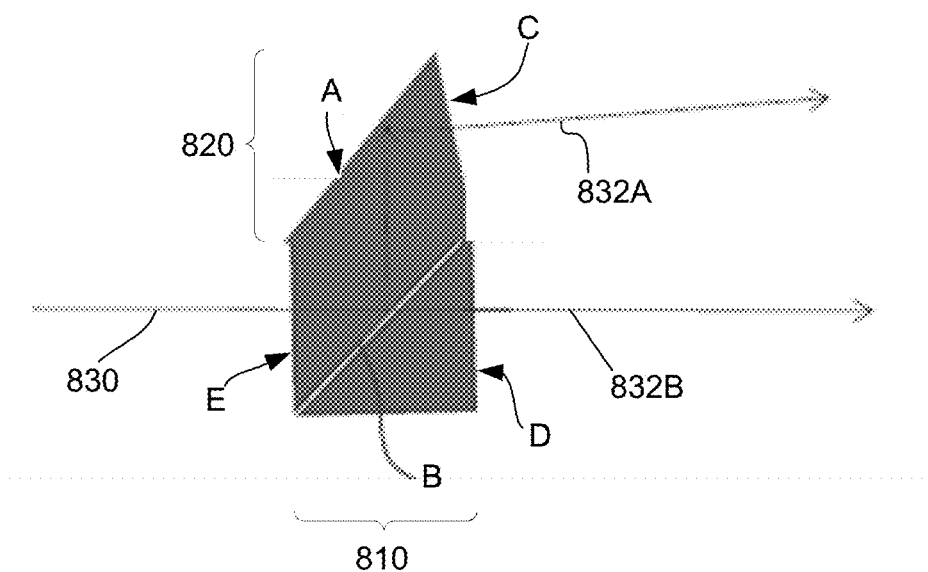

FIG. 8 schematically shows a situation in which a combination 800 of a polarization beam splitter (PBS) 810 and an additional prismatic element 820 (configured to angularly incline the beams 832A, 832B having mutually orthogonal polarizations with respect to one another) is used for the same purpose. As shown, the incident beam 830 is split into beams 832A, 832B configured according to an embodiment of the idea of the invention. Preferably, the input planar surface of the element 820 and one of the output planar surfaces of the PBS 810 are placed substantially in optical contact with one another, to avoid spurious optical reflections of light. Here, the surfaces A and C are the surfaces of the prism 820. Surfaces E and D are outer surfaces of the PBS 810. B is the inner surface of the PBS 810, and carries an appropriate coating thereon, as known in related art. Surfaces A and B are not parallel to one another, and/or surfaces C and D are not parallel to one another.

Table 1 below summarizes a couple of examples of experimental parameters characterizing practical implementations of embodiments of the invention:

|  |  | Overlap of two constituent sub-beams | Overlap of four constituent sub-beams |
|---|---|---|---|
| Birefringent material | Quartz |  |  |
| Laser Wavelength | 638 nm |  |  |
| Refractive index of E-ray | 1.55338 |  |  |
| Refractive index of O-ray | 1.54425 |  |  |
| Refractive index difference | 0.00913 |  |  |
| Laser spot FWHM | um | 10 | 10 |
| Laser 1/e^2 diameter | um | 17 | 17 |
| spacing between adjacent beam | um | 9 | 7.5 |
| focal length | mm | 25 | 25 |
| angle between adjacent beam | arc-min | 1.24 | 1.03 |
| angle of the first wedge | deg | 2.26 | 3.77 |
| angle of the second wedge | deg | N/A | 1.88 |

While the discussion of program-controlled governing of the operation of the embodiment of the system of the invention and/or performing the embodiment of the method of the invention may not have been expressly presented above, the skilled person will understand that an embodiment of the invention may incorporate (the use of) a processor controlled by instructions stored in a memory. The memory may be random access memory (RAM), read-only memory (ROM), flash memory or any other memory, or combination thereof, suitable for storing control software or other instructions and data. Those skilled in the art should readily appreciate that functions, operations, decisions, processes of an embodiment of the method may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this disclosure embodiments have been described in a way that enables a clear and concise specification to be written, but it is intended and will be appreciated that embodiments may be variously combined or separated without parting from the scope of the invention. In particular, it will be appreciated that all features described herein at applicable to all aspects of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The term "and/or", as used in connection with a recitation involving an element A and an element B, covers embodiments having element A alone, element B alone, or elements A and B taken together.

While the invention is described through the above-described examples of embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

What is claimed is:

1. A method comprising:
    separating a polarized beam of light into multiple beams including a first beam having a first polarization and a second beam having a second polarization by transmitting the polarized beam of light through at least one optical prism,
        wherein the first and second polarizations are different from one another, wherein the separating includes separating the polarized beam of light into multiple pairs of beams, wherein a first beam in each pair has a corresponding first polarization and a second beam in each pair has a corresponding second polarization;
    directing the first beam in a first direction and directing the second beam in a second direction, the first and second directions being separated by a displacement; and
    spatially overlapping the first and second beams of light and spatially overlapping all multiple beams to form an illuminated region with a cross-sectional area characterized by a substantially uniform distribution of light,
    wherein the method is devoid of using an optical waveplate.

2. A method according to claim 1, wherein one of a first condition and a second condition is satisfied, wherein:
    the first condition comprises:
    (a) transmitting the polarized beam of light through a birefringent material oriented to have a single optical axis thereof oriented substantially perpendicularly to a direction of propagation of the polarized beam of light; and/or
    (b) transmitting the polarized beam of light through the birefringent material dimensioned as a wedged prism having an incident surface thereof substantially perpendicular to the direction of propagation of the polarized beam of light; and/or
    (c) transmitting the polarized beam of light through the birefringent material while orienting a vector of linear polarization of the polarized beam at a substantially 45-degree angle with respect to the single optical axis of the birefringent material,
    and
        the second condition comprises transmitting the polarized beam of light through a Wollaston prism or a polarization beam splitter.

3. A method according to claim 1, wherein the directing includes focusing the first beam of light into a first focal spot and focusing the second beam of light into a second focal spot, the first and second focal spots being separated by a focal separation distance.

4. A method according to claim 3, wherein a value of the displacement is between 60% and 120% of a cross-sectional size of the first beam or the second beam.

5. A method according to claim 1, wherein the spatially overlapping includes forming the illuminated region substantially devoid of optical interference between the first and second beams and wherein the cross-sectional area is substantially transverse to a direction of propagation of the polarized beam.

6. A method according to claim 1, wherein the separating includes transmitting light from the polarized beam of light through multiple birefringent crystals.

7. A method according to claim 6, wherein the separating includes transmitting the light from the polarized beam of light sequentially through multiple birefringent crystals.

8. A method according to claim 1, further comprising:
    (a) rotating a vector of polarization of the polarized beam of light prior to said transmitting the polarized beam of light through the at least one optical prism; and/or
    (b) co-locating the illuminated region and a sample region of a moving particle analyzer system to analyze moving particles of a chosen sample present in the sample region, and/or co-locating the illuminated region and a sample region of a flow cytometry system.

9. A method according to claim 8, wherein, when said rotating is present, said rotating includes:
    rotating a mechanical frame of a laser source configured to generate said polarized beam of light about an axis of the polarized beam of light, and/or
    transmitting the polarized beam of light through a Faraday rotator system.

10. A system comprising:
    a laser source configured to generate a polarized beam of light;
    an optical element configured to receive the polarized beam of light, generated by the laser source in operation, and to separate the polarized beam of light into multiple beams of light including a first beam and a second beam, the first and second beams having different states of polarizations;
    a first optical device configured to acquire and redirect the multiple beams in respectively-corresponding different directions that are separated by a displacement such as to spatially overlap the first and second beams in an illuminated region having a cross-sectional area characterized by a substantially uniform distribution of light; and
    a second optical device configured to rotate a vector of polarization of the polarized beam of light and disposed between the laser source and the optical element,
    wherein the system does not include an optical waveplate.

11. A system according to claim 10, wherein:
    (a) the optical element includes (i) a birefringent material and/or a Wollaston prism, or (ii) a polarization beamsplitter; and/or
    (b) the system further comprised a tangible component dimensioned to house a flow of moving sample particles; and/or
    (c) the first optical device comprises a light-focusing device configured to focus the first beam acquired by said light-focusing device into a first focal spot and focusing the second beam acquired by said light-focusing device into a second focal spot, the first and second focal spots being separated by focal separation distance.

12. A system according to claim 10, wherein the first optical device includes an optical lens and/or an optical reflector.

13. A system according to claim 10, wherein:
    (a) the system comprises at least one of the following: a particle analyzer and a cytometry system; and/or
    (b) the optical element includes a birefringent material that has a material composition that includes quartz.

14. A system according to claim 10, wherein:
    (a) the optical element includes a birefringent material that is oriented to have a single optical axis thereof substantially perpendicular to a direction of propagation of the polarized beam of light; and/or
    (b) the optical element includes the birefringent material dimensioned as a wedged prism having an incident surface thereof oriented approximately perpendicularly to the direction of propagation of the polarized beam of light; and/or (c) the optical element includes the birefringent material while orienting a vector of linear polarization of the polarized beam at a substantially 45-degree angle with respect to the single optical axis of the birefringent material.

15. A system according to claim 10, wherein the displacement includes an angular displacement.

16. A system according to claim 10, comprising a combination of first and second birefringent materials, said combination being configured to separate the polarized beam of light into multiple pairs of beams, wherein a first beam in each pair has a corresponding first polarization and a second beam in each pair has a corresponding second polarization; and spatially overlapping all multiple beams to form said illuminated region.

17. A method comprising:

delivering a polarized beam of light generated by a light source directly to at least one optical prism;

separating the polarized beam of light into multiple beams including that include a first beam having a first polarization and a second beam having a second polarization by transmitting the polarized beam of light through the at least one optical prism;

directing the first beam in a first direction and directing the second beam in a second direction, the first and second directions being separated by a displacement;

necessarily incoherently spatially overlapping the first and second beams of light to form an illuminated region with a cross-sectional area characterized by a substantially uniform distribution of light, and further comprising:

(a) rotating a vector of polarization of the polarized beam of light prior to said transmitting the polarized beam of light through the at least one optical prism by rotating a mechanical frame of the light source; and/or (b) co-locating the illuminated region and a sample region of a moving particle analyzer system to analyze moving particles of a chosen sample present in the sample region, and/or co-locating the illuminated region and a sample region of a flow cytometry system.

18. A method according to claim 17, comprising:

(a) transmitting the polarized beam of light through a birefringent material oriented to have a single optical axis thereof substantially perpendicular to a direction of propagation of the polarized beam of light; and/or (b) transmitting the polarized beam of light through the birefringent material dimensioned as a wedged prism having an incident surface thereof approximately perpendicularly to the direction of propagation of the polarized beam of light; and/or (c) transmitting the polarized beam of light through the birefringent material while orienting a vector of linear polarization of the polarized beam at a substantially 45-degree angle with respect to the single optical axis of the birefringent material.

* * * * *